United States Patent [19]

Richard

[11] Patent Number: 4,573,496

[45] Date of Patent: Mar. 4, 1986

[54] HYDRAULIC POWER STEERING GEAR AND ROTARY VALVE THEREFOR

[75] Inventor: Dennis J. Richard, Linwood, Mich.

[73] Assignee: General Motors Corporation, Detroit, Mich.

[21] Appl. No.: 601,499

[22] Filed: Apr. 18, 1984

[51] Int. Cl.[4] .................... F16K 11/12; F16K 11/085; F16J 9/24
[52] U.S. Cl. .......................... 137/625.21; 137/625.24; 219/69 R; 219/69 V; 91/375 A; 91/375 R; 251/900; 277/177; 277/136; 277/166
[58] Field of Search ................ 277/53, 207 R, 208, 277/134, 136, 137, DIG. 8, 166, 177, 83, 84, 85; 137/625.21, 625.22, 625.23, 625.24; 251/DIG. 1, 366, 332; 91/375 A, 375 R; 219/69 R, 69 M, 69 V

[56] References Cited

U.S. PATENT DOCUMENTS 1,878,731  9/1932  Thompson .................... 277/1
3,022,772  2/1962  Zeigler et al. .................. 91/375 A Primary Examiner—Martin P. Schwadron
Assistant Examiner—John S. Starsiak, Jr.
Attorney, Agent, or Firm—Charles R. White

[57] ABSTRACT

Seal wear of hydraulic power steering gear housing is reduced by forcing relative motion to occur between the seal and the control valve whose material is typically more wear resistant than the material of the housing.

6 Claims, 4 Drawing Figures

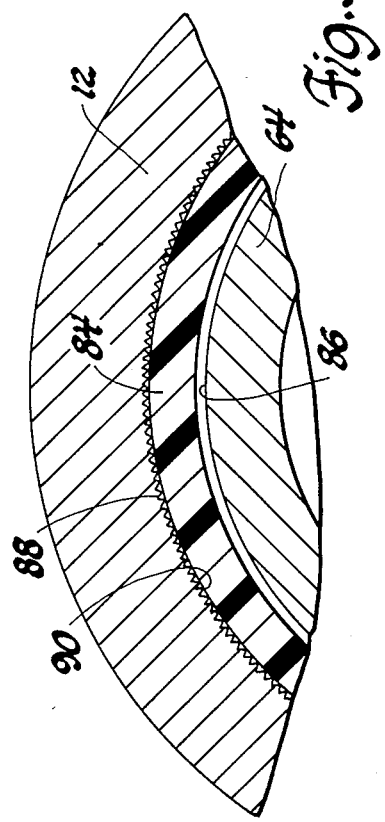
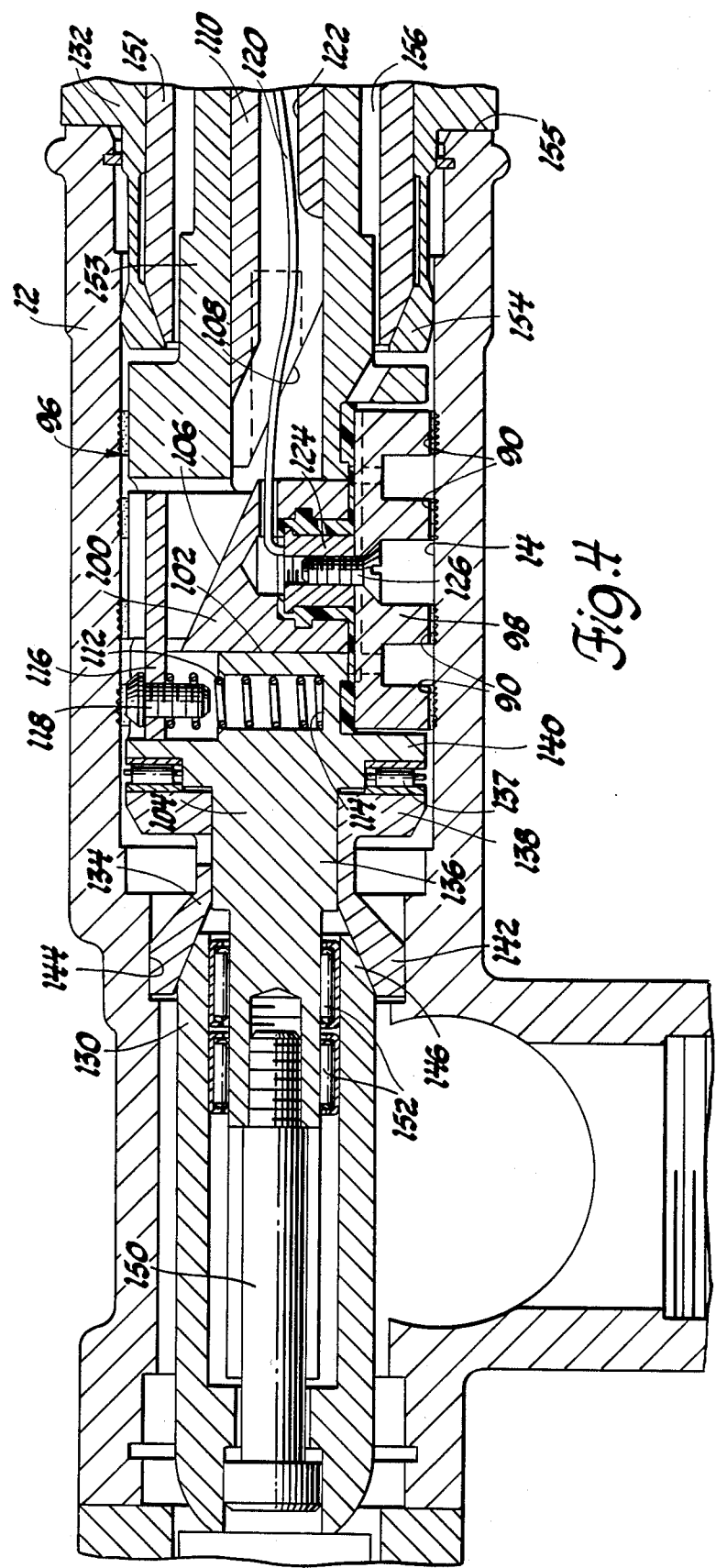

HYDRAULIC POWER STEERING GEAR AND ROTARY VALVE THEREFOR

This invention relates to hydraulic power steering gears for vehicles and more particularly to a new and improved rotary valve and valve housing for controlling oil flow in a power steering gear featuring the transfer of the wear site of rotary seals of the gear valving from the relatively soft metal valve bore to the relatively hard metal valve body to optimize power steering gear service life and operation.

Prior to the present invention, vehicle power steering gears have employed open center rotary hydraulic valve assemblies connected to and actuated by the vehicle steering wheel for controlling the flow of fluid between a pressure source and an actuator for effecting the power assist steering of the dirigible wheels of a vehicle. Such rotary control valve assemblies generally include an outer hollow cylindrical steel valve body rotatably mounted within a bore formed in a lightweight high strength aluminum steering gear housing. The cylindrical valve body is rotatably mounted on an operator actuated valve spool which is drivingly connected to rack and pinion or other gearing by a lost motion connection. A torsion bar operatively forming part of the valve assembly provides a spring normally centering the valving when power assist steering is not desired and allowing the valve body and spool to be relatively rotated when power assist steering is demanded. The valve body has an annular hydraulic pressure groove and annular left and right turn power grooves formed in the outer surface thereof separated by annular seals of reinforced Teflon or other hardened plastic material which have sliding contact with the inner wall of the bore in the steering gear housing when the valve body is rotated in its bore on steering inputs.

While these power steering gears provide high quality steering with long service life, the inner surface of the valve bore of power steering gear housing is comparatively soft and can become grooved or worn by the Teflon seals to some extent under adverse conditions and after protracted use. This wear may result in leakage across the seals and may detract from operating efficiency service life requiring the rebuilding or replacement of the valving as well as the refinishing of the internal surface of the housing to effect high efficiency sealing between the pressure and power grooves.

The present invention is drawn to a new and improved housing and valve assembly for a hydraulically powered steering gear which transfers the wear site of the rotary seals from the rotary valve bore in the housing to the valve body to minimize wear at the interface between the seals and the valve bore.

It is another feature, object and advantage of the present invention to provide a new and improved control valve for a hydraulically powered steering gear with new and improved sealing between the valve bore in the steering gear housing and the steering valve body which can be obtained with minimized changes to existing valve and housing constructions.

Another feature, object and advantage of this invention is to provide a new and improved rotary valve and housing assembly for a power steering gear featuring retention surfaces in the valve bore in the housing adapted to grip the rotary seals of the valve body so that the seals rotate relative to the valve body and are held relative to the housing to prevent grooving and wear of the internal wall of the valve bore of the housing.

Another feature, object and advantage of this invention is to provide a new and improved rotary valve assembly for a power steering gear in which a steel valve body carries rotatable annular reinforced plastic seals which are retarded from normal rotation relative to the housing by texturizing and hardening the aluminum surface of seal contact areas of the housing bore in which the valve body is mounted to reduce relative rotation between the seal and housing to thereby minimize frictional wear of the bore walls by the seals and minimize leakage of power steering gear fluid between the seals.

Another feature, object and advantage of this invention is to provide a new and improved method of making a hydraulic power steering gear for a vehicle in which preselected internal surface areas of the valve bore in an aluminum housing are texturized to contact and retard rotation of valve body plastic seals relative to the bore and so that the seals rotate relative to the wear resistant steel valve body to inhibit wear of the bore and to increase seal performance.

These and other features, objects and advantages of this invention will be more apparent from the following detailed description and drawing in which:

FIG. 3 is a cross-sectional view taken along site line 3—3 of FIG. 2.

FIG. 4 is a cross-sectional view of the power steering gear housing of FIG. 1 with tooling inserted therein for texturizing portions of the valve bore of the housing.

Figure 1:
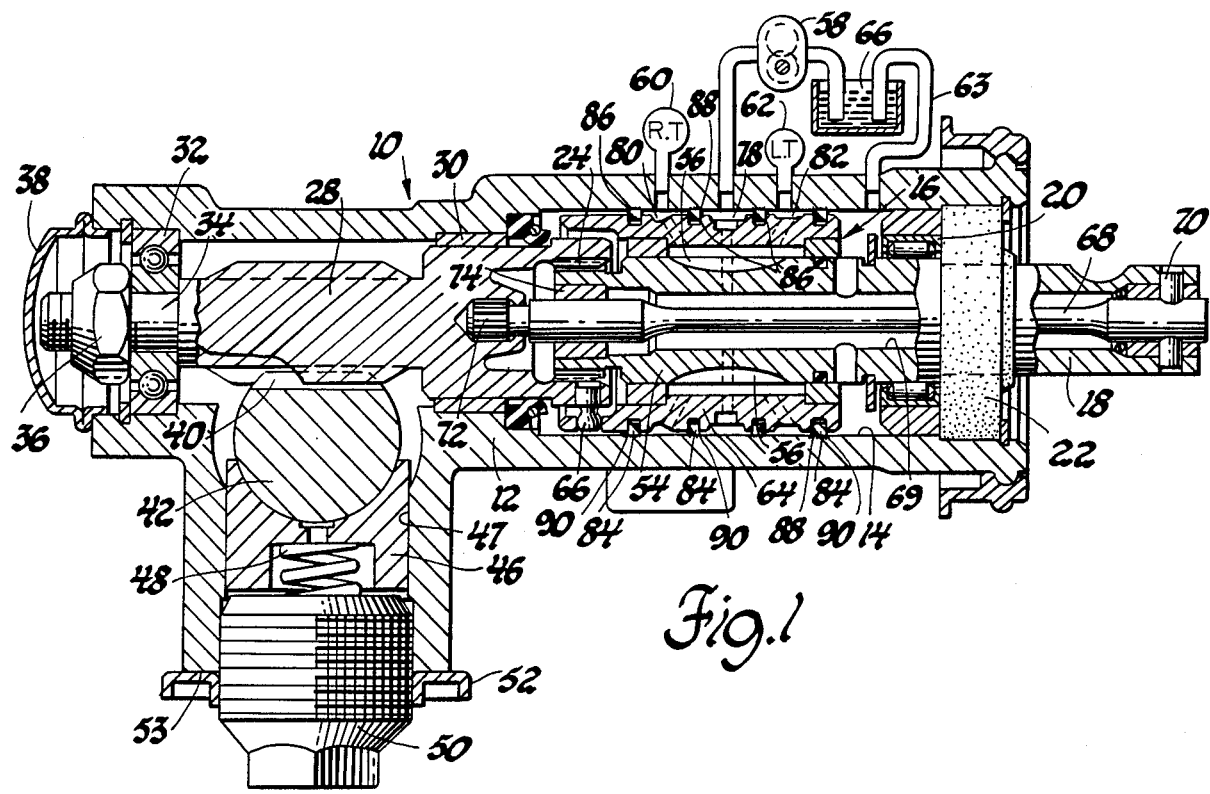
FIG. 1 is a cross-sectional view of an integral rack and pinion power steering gear and valve assembly and a schematic hydraulic circuit added thereto.
Figure 2:
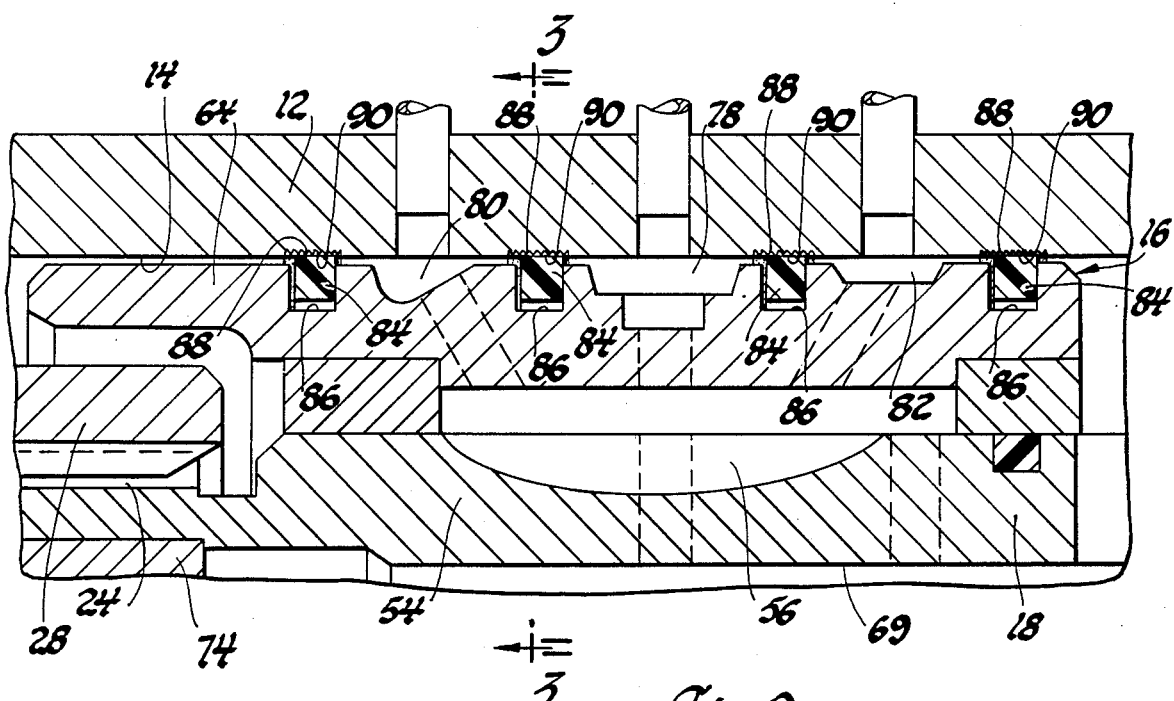
FIG. 2 is an enlarged view of a portion of the steering gear and valve assembly of FIG. 1.

Turning now in greater detail to the drawing, FIG. 1 shows a portion of an integral rack and pinion power steering gear 10 having a main housing 12 cast or otherwise formed from aluminum or other suitable lightweight metal. This aluminum housing has a cylindrical smooth wall bore 14 formed therein which receives a cylindrical rotary power steering gear valve assembly 16 operatively mounted therein for actuation by a vehicle operator for power assist steering of the dirigible wheels of a vehicle, not illustrated. The valve assembly 16 includes an elongated cylindrical spool shaft 18 mounted for turning movement in the housing 12 by a bearing assembly 20. This spool shaft projects through an annular fluid seal 22 closing the upper end of the housing for connection by a conventional steering shaft to a suitable steering wheel which is not shown. The end of the spool shaft 18 is splined at 24 with a selected predetermined clearance or lash before mechanical drive to an elongated pinion gear 28 rotatably mounted in the housing by a sleeve bearing 30 and by ball bearing assembly 32 that receives an extended shank portion 34 of the pinion gear 28. A nut 36 threaded onto the end of the shank portion 34 outboard of bearing 32 secures the pinion gear with the housing 12. A cup-like cover 38 frictionally fits into an open end of the housing 12 at the lower end thereof to provide service access.

The teeth of pinion gear 28 mesh with the toothed portion 40 of an elongated rack 42 mounted for linear sliding movement within the power steering gear housing 12 and within a connected power cylinder housing which generally may be like that described in U.S. Pat. No. 4,454,801, issued June 19, 1984 to Chris R. Spann and assigned to the assignee of this invention and hereby incorporated by reference. The rack 42 is operatively connected to the dirigible wheels of the vehicle by suitable ball joints and tie rods, not illustrated. In such an arrangement, the linear movement of the rack turns the dirigible wheels of the vehicle for vehicle steering purposes.

The close meshing engagement between the teeth of the pinion and the rack is achieved by the rack contact shoe 46 which is slidably mounted in a second bore 47 in housing 12 and is biased by helical spring 48 operatively interposed between contact shoe 46 and adjusting plug 50. Plug 50 is threaded into the end of housing bore 47 and can be advanced or retracted with a wrench to vary the force of spring 48 and thereby the tooth engagement forces between the rack and pinion gears for lash adjustment. An adjustor plug nut 52 is threaded onto plug 50 and against face 53 of the housing to maintain the plug in selected position.

The spool shaft 18 of the power steering valve assembly 16 has a cylindrical valve spool 54 formed thereon. The valve spool has a plurality of longitudinally extending, arcuate, oil transfer slots 56 equally spaced in the periphery thereof. These slots form part of the hydraulic system which can be conditioned to connect the pressure fluid from hydraulic pump 58 to right or left turn power cylinder chambers 60, 62 and to an exhaust passage 63 which feeds into a fluid reservoir 66 for pump 58.

In addition to the valve spool 54, the valve assembly 16 includes a cylindrical valve body 64 rotatably mounted within valve bore 14 and on the valve spool 54. The inner end of the valve body 64 extends over the end of the pinion 28 and is drivingly connected thereto by radial pin 66. An elongated torsion bar 68 extends concentrically through axial opening 69 in the spool shaft 18 to provide a centering spring connection between the valve spool 54 and the valve body 64. A cross pin 70 connects the outer end of the torsion bar 68 to the corresponding end of the spool shaft 18 while the inner end of this torsion bar is splined at 72 to the pinion 28. Bearing sleeve 74 supports the inner end of the spool shaft on a cylindrical portion of the torsion bar. With this torsional spring interconnection, the valve spool can be turned relative to the valve body so that the valves route pressure oil for power assist steering, on termination of the rotational input, the valve body and spool are centered by the torsion bar to terminate power assist steering. The steering gear valving and the hydraulic system thereof may be like that disclosed in the above-referenced U.S. Pat. No. 4,454,801 to Spann or that of the patent to Zeigler et al U.S. Pat. No. 3,022,772 issued Feb. 27, 1962 for Rotary Power Steering Valve With Torsion Bar Centering assigned to the assignee of this invention and hereby incorporated by reference.

The valve body 64 is formed with a centralized annular fluid pressure groove 78 in the outer periphery thereof disposed between the annular right turn power groove 80 and the left turn power groove 82. Annular seals 84 of reinforced Teflon or other plastics material are rotatably mounted in annular seal retainer grooves 86 formed in the lands separating the pressure groove 78 with the right and left turn power grooves 80, 82 and in the lands outboard of these power grooves. The seals 84 are designed to have an outer diameter which closely fits into the bore diameter so that the outer periphery 88 of each seal 84 is in frictional engagement with an aligned annular friction band 90 preferably formed by texturizing annular circular areas of the smooth wall cylindrical surface of bore 14.

These texturized friction bands 90 provide a high coefficient of friction between the seals 84 and the bore 14 so that the seals are held by the housing when the valve body 64 is turned during steering operation. With this seal retention, the site of relative rotation of the seal is transferred from the comparatively soft surface presented by the bore 14 of the aluminum housing to the hard and wear resistant surfaces of the retainer grooves 86 of the steel valve body. With the seals 84 rotating relative to the steel walls of the retainer grooves 86 there is little or no wear of the wall forming bore 14, the seal retainer grooves 86 or of the seals 84 themselves. Accordingly, leakage past the seals 84 is minimized further increasing the efficiency and service life of the rotary valves of power steering gears.

In addition to providing a high coefficient of friction for seals 84, the texturized friction bands preferably provide a hardened surface reducing wear that may otherwise occur in the bore wall on inadvertent or unintentional movement of the seals relative to the bore wall. For example, the seals may experience some axial movement in their retention grooves from pressure differentials appearing across the seals. This results in some sliding movement of the seals along the bore wall and, in the absence of the hardened surfaces, causes bore wall wear and leakage across the seals. Furthermore, in some cases, relative rotation may occur between the seals and the bore walls because of different rates of expansion and contraction between the seals, valve housing and valve body or because of production tolerance variation resulting in a seal having an outer diameter which only marginally contacts the internal diameter of the bore. Assuming such limited rotation between the seal and the bore wall, the hardened friction surface presented by bands 90 effectively resists wear and grooving of the bore wall so that high efficiency valve operation is effectively maintained.

The friction bands 90 are preferably formed by recasting surface layers of the bore wall for frictional properties and for hardness and wear resistance using electrical discharge machining (EDM). An illustrative device for electrical discharge machining is shown in FIG. 4 and identified by reference numeral 96 within operating position in housing 12. The device comprises a four-fingered electrode 98 supported for radial movement toward and away from the wall of the bore 14 by a plunger 100 slidable in a radial slot 102 formed in an electrode support fixture 104. The plunger has an inclined camming surface 106 engageable by a similarly inclined camming surface 108 formed on the end of an actuator rod 110 mounted for longitudinal sliding movement along the axis of the electrode fixture 104. On such inward axial movement, the camming faces engage and the plunger is moved radially outwardly to position the electrode 98 closely adjacent to the wall of the housing valve bore 14. A return spring 112 seated in pocket 114 in the electrode support fixture 104 bears against an arm 116 extending from the plunger to urge the electrode 98 from the wall of bore 14. A screw 118 threaded through arm 116 extends into the ends of the helical spring to maintain the spring in operative position.

A wire conductor 120 extends through a centralized passage 122 of the actuator rod and is connected to a feeder terminal 124 which in turn is operatively fastened to the electrode 98 by a screw 126.

The electrode and electrode support assembly is positioned for rotation with the housing 12 by upper and lower collets 134 and 132. The upper collet 134 fits on a stepped cylindrical shank 136 of the electrode support fixture 104. A needle-type thrust bearing 137 is operatively mounted between radial flange 138 of the collet 134 and a similar flange 140 on the electrode support fixture. The collet has split fingers 142 that are cammed outwardly into engagement with the walls of a counterbore 144 in the housing by the engagement with the coned end 146 of the upper collet actuator or expander 130. The collet actuator 130 is loosely retained on the shank portion 136 of the electrode support fixture by screw 150 threaded into the end thereof. Needle bearings 152 interposed between the shank portion 136 and the inner wall of the nose member 130 permit the relative rotation of the electrode and electrode support with respect to the upper and lower collets.

The lower collet 132 has a collet actuator tube 151, the end of which fits over the stepped cylindrical shoulder 153 of the electrode support fixture. The forward end of this tube is tapered to cam the contact fingers 154 of the lower collet against the wall of the valve bore 14. By urging the fingers 154 outwardly in response to inward movement of the tubular element, the electrode support assembly is held within the housing with the electrode being positioned by contact of the flange of the lower collet against an end face 155 of the housing.

In operation, the actuator rod 110 is moved inwardly to act against spring 112 to positioned the electrode closely adjacent the wall of bore 14. A dielectric oil is flooded into the housing through the passage 156 between the lower collet and the electrode fixture while the electrode and electrode support fixture is rotated. Electric current is supplied to the electrode and is discharged across the gap between the electrode and the housing which is connected into the electro-discharge machine circuitry. Ionized oil vapor occurring as bubbles in the intervening oil between the electrode and housing provides a conductive path for the electrical discharge.

With the rotation of the energized electrodes, surface layers of the bore walls are heated to a temperature sufficient to effect a recasting of the surface to form the laterally spaced bands 90. During this recasting, particulate matter or fines are expelled from the housing surface and flushed away by the oil exiting through the upper part of the housing. These bands exhibit a hardened layer that may be of a depth up to 30 microns. This layer results from melting and rapid self-quenching of the housing surface that occurs during the EDM process. Silicon-rich second phase particles which are present in the housing material also become molten during EDM processing and are retained homogeneously in solution in this surface layer. Formation of the layer along with expulsion of material effects the increased hardness and the texturized frictional surface which cooperates with the seal rings to provide the improved seal grip and to effectively resist wear with its hardened surface in the event of any seal movement. The finely pitted texturized surface is harder than the bulk material forming the housing to offer improved wear resistance to any seal ring rotation or sliding movement relative to the housing. The homogeneous microstructure of the surface layer produced by the electro discharge machining minimizes this contribution to wear.

While the rings 90 have been described as being formed to elecrerical discharge machining, they may be made in other ways and in other forms without hardening by grit blasting or by machining knurls of various geometries across the interior surface of the housing bore.

While a preferred embodiment and method have been described and illustrated to disclose the invention, other modifications will be apparent to those skilled in the art. Accordingly, the scope of this invention is set forth in the following claims.

The embodiments of the invention in which an exclusive property or privilege is claimed are defined as follows:

1. A power steering gear for a vehicle comprising a metallic housing having a smooth wall cylindrical bore formed therein, said housing having hydraulic inlet and outlet ports for operative connection to a hydraulic pump and to a sump for the hydraulic pump, said housing having a plurality of fluid passages extending through the wall of said housing to the bore therein, a rotary valve assembly rotatably mounted in said bore for supplying fluid pressure to said fluid passages, a rotatable steering gear input, said rotary valve assembly comprising a valve spool operatively connected to said steering gear input and a cylindrical valve body operatively mounted on said valve spool and within said valve bore, said valve body having a plurality of laterally spaced annular seals rotatably mounted on the outer periphery of said valve body and discrete texturized gripping surface means on the wall of said bore for directly contacting the outer periphery of said seals to inhibit said seals from rotating relative to said bore and so that said seals will rotate relative to said valve body to thereby reduce wear of cylindrical wall of said bore by said seals as said input is rotated.

2. A power steering gear for a vehicle comprising a metallic housing of a given hardness having a cylindrical bore formed therein, said housing having hydraulic inlet and outlet ports formed therein respectively operatively connected to a hydraulic pump and to a sump for the hydraulic pump, a plurality of outlet passages extending through the wall of said housing and through the wall of the bore therein, a rotary valve assembly operatively mounted in said bore for supplying fluid pressure to said outlet passages, said rotary valve assembly comprising a valve spool operatively connected to a steering gear input and a metallic cylindrical valve body operatively mounted on said valve spool and within said valve bore, said valve body having a hardness greater than that of said housing, said valve body having a plurality of laterally spaced annular seals rotatably mounted on the outer periphery of said valve body for contacting the inner walls of said housing to provide separate fluid passages therebetween and discrete hardened gripping surface means formed on the walls of said bore to directly contact the outer periphery of said seals to inhibit the relative rotation of said seals and said bore and so that said seals will rotate freely relative to said valve body to thereby inhibit wear of the cylindrical wall of said bore by said seals as said input is rotated.

3. A power steering gear for a vehicle comprising a metallic housing of a relatively soft metal such as aluminum having a cylindrical bore formed therein, said housing having hydraulic inlet and outlet ports formed therein respectively operatively connected to a hydraulic pump and to a sump for the hydraulic pump, a plurality of outlet passages extending through the wall of said housing into the bore therein, a rotary valve assembly operatively mounted in said bore for supplying fluid pressure to said outlet passages, said rotary valve assembly comprising a valve spool operatively connected to a steering gear input and a cylindrical valve body of a relatively hard metal such as steel operatively mounted on said valve spool and within said valve bore, said valve body having a plurality of laterally spaced annular seals rotatably mounted on the outer periphery of said valve body for directly contacting the inner walls of said housing to provide separate fluid passages therebetween, said wall having discrete roughened gripping surface means to contact the outer periphery of said seals to prevent said seal from rotating relative to said bore and so that said seals will rotate relative to said valve body to thereby inhibit wear of the cylindrical wall of said bore by said seals as said input is rotated.

4. A power steering gear for a vehicle comprising a steering gear housing having a bore therein, a rotary valve assembly operatively mounted within said bore, said rotary valve assembly having a valve body operatively mounted within said bore and having a valve spool operatively mounted within said valve body, said valve body having a plurality of annular fluid transmission grooves formed in the periphery of said valve body, said valve body having an annular seal retainer groove means formed between adjacent fluid transmission grooves, annular seal means rotatably mounted in said groove means, and discrete texturized surfaced means formed on the inner wall of said bore for direct contact with said the outer periphery of said seal means to inhibit rotation thereof relative to the housing and to promote the rotation thereof relative to said valve body.

5. The power steering gear of claim 4 wherein said discrete texturized surface means is hardened to resist wear from sliding movement between said seals and said housing.

6. A power steering gear for a vehicle comprising a metallic housing having a smooth wall cylindrical bore formed therein, said housing having hydraulic inlet and outlet ports for operative connection to a hydraulic pump and to a sump for the hydraulic pump, said housing having a plurality of fluid passages extending through the wall of said housing to the bore therein, a rotary valve assembly rotatably mounted in said bore for supplying fluid to and for exhausting from said fluid passages, a rotatable steering gear input, said rotary valve assembly comprising a valve spool operatively connected to said steering gear input and a cylindrical valve body operatively mounted on said valve spool for rotary movement within said valve bore, said valve body having a plurality of laterally spaced annular seals rotatably mounted on the outer periphery of said valve body to hydraulically separate said fluid passages and texturized gripping surface means on the inner diameter of said bore for directly contacting the outer periphery of said seals such that on rotary movement of said valve body, said seals remain substantially stationary relative to said housing for reducing frictional wear of the cylindrical wall of said bore by said seals.

* * * * *